United States Patent [19]
Buck

[11] Patent Number: 5,495,720
[45] Date of Patent: Mar. 5, 1996

[54] PROCESS FOR SETTING, CONTROLLING AND MONITORING THE LEVEL IN A REFRIGERANT EVAPORATOR

[76] Inventor: Wilhelm Buck, St. Hülfe 200, D-2840 Diepholz, Germany

[21] Appl. No.: 244,551

[22] PCT Filed: Nov. 27, 1992

[86] PCT No.: PCT/EP92/02739

§ 371 Date: May 27, 1994

§ 102(e) Date: May 27, 1994

[87] PCT Pub. No.: WO93/11394

PCT Pub. Date: Jun. 10, 1993

[30] Foreign Application Priority Data

Nov. 28, 1991 [DE] Germany .......................... 41 39 064.4

[51] Int. Cl.⁶ ..................................................... F25B 41/04
[52] U.S. Cl. ................... 62/115; 62/202; 62/225
[58] Field of Search .............................. 62/129, 202, 204, 62/210, 212, 222, 224, 225, 155

[56] References Cited

U.S. PATENT DOCUMENTS

| 4,571,951 | 2/1986 | Szymaszek | 62/225 X |
| 4,835,980 | 6/1989 | Oyanagi et al. | 62/225 X |
| 5,050,393 | 9/1991 | Bryant | 62/216 X |

FOREIGN PATENT DOCUMENTS

| 3934801 | 4/1991 | Germany | 62/224 |
| 4006040 | 8/1991 | Germany . | |

*Primary Examiner*—Harry B. Tanner
*Attorney, Agent, or Firm*—Herbert Dubno

[57] ABSTRACT

In a process for setting, controlling and monitoring the level in a refrigerant evaporator (3) inserted in a closed circuit of a refrigerating machine (1) and evaporating a mass flow of refrigerant (4) into a substantially dry power gas, a heatable measuring body (11) is built into the power gas line (71) arranged downstream of the refrigerant evaporator (3). The measuring body (11) is surrounded by the flow of power gas. It is heated to a temperature surpassing the temperature of the power gas. The impact of the fluid refrigerant drops on the measuring body (11) is determined by measuring the energy required for the evaporation of the fluid drops. A reliable evaluation of the measuring signals is achieved when these are compared with a basic signal, which is composed by a first partial signal coming from the electronic noise of a measuring and evaluation unit (93) used for the implementation of the process and a second partial signal coming from the flow of power gas passing around the measuring body (11), whereby the difference between the measuring signal and the basic signals is found and compared with an adjustable reference value, which is established for the level of moisture in the power gas above which the power gas is to be considered moist, respectively wet.

17 Claims, 7 Drawing Sheets

PROCESS FOR SETTING, CONTROLLING AND MONITORING THE LEVEL IN A REFRIGERANT EVAPORATOR

CROSS REFERENCE TO RELATED APPLICATIONS

This application is a national phase of PCT/EP92/02739, filed 27 Nov. 1992, and is based, in turn, upon German national application P 41 39 064.4 of 28 Nov. 1991, under the International Convention.

FIELD OF THE INVENTION

The invention relates to a process for setting, controlling and monitoring the level in a refrigerant evaporator in a closed circuit of a refrigerator and evaporating a mass flow of refrigerant to a substantially dry gas.

BACKGROUND OF THE INVENTION

In this process in a refrigerant line arranged downstream of the refrigerant evaporator a heatable measuring unit is inserted. The refrigerant flows around it. The measuring unit is heated to a temperature which is greater than that of the refrigerant. The impact of liquid drops of the refrigerant on the measuring unit and therewith the moisture content of the gas originating from the refrigerant evaporator is established by measuring the energy required to evaporate the liquid drops impacting the measuring unit.

Such processes are known from DE-OS 39 34 801 and DE-OS 40 06 040. During the implementation of the known process in connection with the refrigerators described in both cited references it has been found that an optimal setting, control and monitoring of the level in the refrigerant evaporator based on the measuring signals at the measuring unit cannot always be achieved during the operation of the refrigerator. This is due in part, to insufficient signal processing.

OBJECT OF THE INVENTION

It is an object of the invention to provided an improved process for the setting, controlling and monitoring of the level in a refrigerant evaporator so that with regard to those operational situations for which the respective refrigerating machine is intended, the refrigerant evaporator can be optimally set, controlled and monitored.

SUMMARY OF THE INVENTION

This object is attained by comparing the detected measuring signal to a basic signal, which is composed of a first partial signal coming from the electronic noise of a measuring and evaluating unit used for the implementation of the process and of a second partial signal from the flow of dry refrigerant passing the measuring unit. The difference between measuring signal and basic signal is found and compared with an adjustable limit or reference value established for that level of moisture content of the gas, above which the gas may be considered wet. In this way it can be insured that signal variations based on the electronic noise and the movements and changes of the flow will not cause new settings or changes in the operational conditions of the refrigerant evaporator. By setting the limit value or the reference value, which correspond to a minimal acceptable moisture content of the gas, but can also correspond to a completely dry gas it is possible to adjust the process to various refrigerants and to various refrigerators.

It is possible to use as a measured value the temperature of the measuring unit, which is then detected by means of a temperature sensor. In this process one measures directly the cooling of the measuring unit occurring at the impact and evaporation of the liquid drops on its outer surface as a result of the heat needed for the evaporation. In this case voltage, current and/or electric power are kept constant.

Instead it is possible to establish the energy required for maintaining a constant temperature of the measuring unit above the reference temperature, whereby then the energy needed for the evaporation of the liquid drops is supplied to the measuring unit by an energy supply source which must anyway be provided for the heating of the measuring unit.

In this case the voltage, the current intensity or even the electric power, which are furnished by the energy supply source used for heating the measuring unit, can serve as the actual measured value.

A particularly precise and significant reading of the measured value results when a predetermined time interval is subdivided to equal time periods, a measuring signal indicating the measured value is picked up and the measuring signals detected during the time interval are classified by magnitude, whereby the first magnitude class comprises all measuring signals ranging between a minimal value of the measuring signals and the minimal value of a measuring signal increased by a differential value, and in the last magnitude class all measuring signals are included which range between the maximal value of the measuring signal and the maximum value of the measuring signal reduced by the differential value, whereby the number of magnitude classes results from the ratio of the difference between the maximal value of the measuring signal and the minimal value of the measuring signal divided by the differential value.

In order to enhance the significance of the found measuring signals indicative of the measured value, the differential value can be measured so that the first magnitude class comprises the partial signal resulting from the electronic noise produced by the measuring and evaluating unit and the first plus second magnitude class corresponds substantially to the basic signal. As soon as a measuring signal appears which would have to be classified higher than the second magnitude class, it establishes the fact that the power gas in the area of the measuring unit is not completely dry.

In the conversion of the analog measuring signal into a digital signal, the classification of measured values can be advantageously performed as follows:

During the measuring process in a time interval Delta T at equal time periods, which are also called scanning intervals Ta, measured values m are detected, i.e. Delta T=m×Ta.

The measuring signal of the measuring unit or the droplet sensor is then fed for instance to an analog/digital converter. The latter supplies after each scanning a digital signal which is proportional to the amplitude of an input measuring signal.

The digital signal is at the same time also the number of the class in which this measured value has to be included in order to establish the amplitude distribution. For instance in an 10-bit-analog/digital converter 1024 classes result, whose class interval in a measuring range of 0 to 30 volt is Delta U=29.3 mV.

The occurrence of a digital signal is perceived as an event. The number of these events is summed up separately for each class. The sum represents the absolute frequency of occurrence in class n.

In an inexpensive manner from the point of view of process technology it is possible to use a multichannel analyzer for the division of the measuring signals in the mentioned magnitude classes.

For measured values which are within the range of the basic signal it applies that the entire energy supplied to the measuring sensor during the scanning interval is carried off by the passing, dry gas. For the measured values which are not within the range of the basic signal, the energy supplied to the measuring sensor during the scanning interval is partially used for the evaporation of the refrigerant impacting the measuring sensor. From this energy fraction it is possible to calculate by means of the evaporation enthalpy the amount of the liquid refrigerant which existed in the considered scanning interval in the area of the measuring sensor.

A considerable simplification of the process results when in a preselected time interval, at equal time periods, a measuring signal indicating the measured value is detected, from the resulting values a minimal and maximal value is found, the difference between the maximal and minimal values is calculated and is compared as an evaluation value with the noise band width resulting due to the electronic noise and the flow of gas passing the measuring unit. For certain refrigerators and certain refrigerants this process may be sufficient in order to insure an optimal operation of the refrigerant evaporator.

Further it is possible to produce a binary impulse sequence by means of a recognition circuit and to compare the number of impulses occurring during a preselected time period with the corresponding established limit value for the maximum acceptable moisture level in the gas.

A further advantageous process technique consists in establishing the minimum or the maximum measured value, each by means of a recognition circuit, to find through analog substraction the amplitude between two succeeding extreme values as an evaluation value and to compare it with a corresponding limit value established for the maximum acceptable moisture level of the gas. Thereby for the determination of the liquid content, or moisture content, the droplet velocity or the droplet density is also involved.

Alternatively the measuring signals can be approximated through a mathematical function, e.g. a polynomial, whereby then the standard deviation from the function is calculated as evaluation value and compared with a limiting value or reference value established for the maximum acceptable moisture level of the gas.

In the mentioned alternative process the preselection of time intervals is required, whereby it could also be suitable under certain circumstances, when the completion of the process takes a long time, to restart the process after a resetting of the operational conditions of the refrigerant evaporator. However as a rule a time interval is predetermined, whereby during the time interval sufficient measured values are read-in and processed and this procedure is continuously repeated.

In case the limit frequency, i.e. the low-pass of the measuring device equipped with the measuring unit is so large that the pulsation of the gas caused by the compressor of the refrigerator influences the measuring signals, this additional periodic signal has to be considered or compensated under certain circumstances. If this has a disturbing influence on the basic signal, this disturbance can be filtered out by a subsequent analog or digital processing.

Further it is also possible to subject the measured data to a spectral analysis. For this purpose from the measured data the autocorrelation function is determined, or another function which can be obtained from the autocorrelation function, e.g. with the aid of a Fourier transform.

A standard for comparison is the function determined from the basic signal. When the difference between the function obtained from the measured signal and the comparative standard is greater than an experimentally found limit value, the gas has to be considered wet.

As long as the droplet density in the gas is comparatively high, it is conceivable that in the measuring time period only such measured values are entered which are influenced by the droplets impacting the measuring unit. In order to be able to find the basic signal also in this case, the flow velocity of the gas is determined separately and independently, in the usual manner. In finding the basic signal it is taken into consideration that in the case of dry gas, after a correspondingly performed calibration, the flow velocity of the gas can be determined from the basic signal. Therefore in reverse it also possible, when the measuring device equipped with the measuring unit is calibrated as a unit for measuring the velocity of dry gas and the flow velocity is known, to find an auxiliary value which corresponds to the basic signal of the droplet sensor, but which as a rule does not comprise any component of the electronic noise or the fluidics noise.

At this point it should be emphasized that a precise determination of the moisture level of the gas, or of the droplet proportion, is possible only when the basic signal value and the signal value corresponding to the droplet proportion can be separated from each other. The measuring signal in the case of a moist gas is composed of the signal part for the electronic noise, the signal part for the passing flow of dry gas, the signal part for the superimposed in some cases self-induced turbulence effects and the signal part for the droplets, which can have a rapid or a slow effect. In opposition to the aforementioned method, in the case of low droplet density the basic signal can be found directly from the measured values of the measuring unit, or respectively droplet sensor, when the following conditions are met:

The scanning time has to be so short, that an adequate resolution is achieved.

The total measuring time has to be so long, i.e. the number of measuring points has to be so high, that at least some of the measured values do not contain any droplet part. At least one of the measured values should be part of a class pertaining to the basic signal, in order to keep the error small. Thus the moisture level has to be so low that not all measured values of the measuring period are influenced by the droplet part. As a rule this condition can be met only when the energy which is drained from the measuring unit in the measuring period due to the evaporation process of the impacting droplets is very small in comparison to the energy drained from the measuring unit due to the passing flow of dry gas.

During the measuring time the velocity of the gas is practically not allowed to change.

BRIEF DESCRIPTION OF THE DRAWING

The above and other objects, features, and advantages will become more readily apparent from the following description, reference being made to the accompanying drawings in which.

SPECIFIC DESCRIPTION

Figure 1:
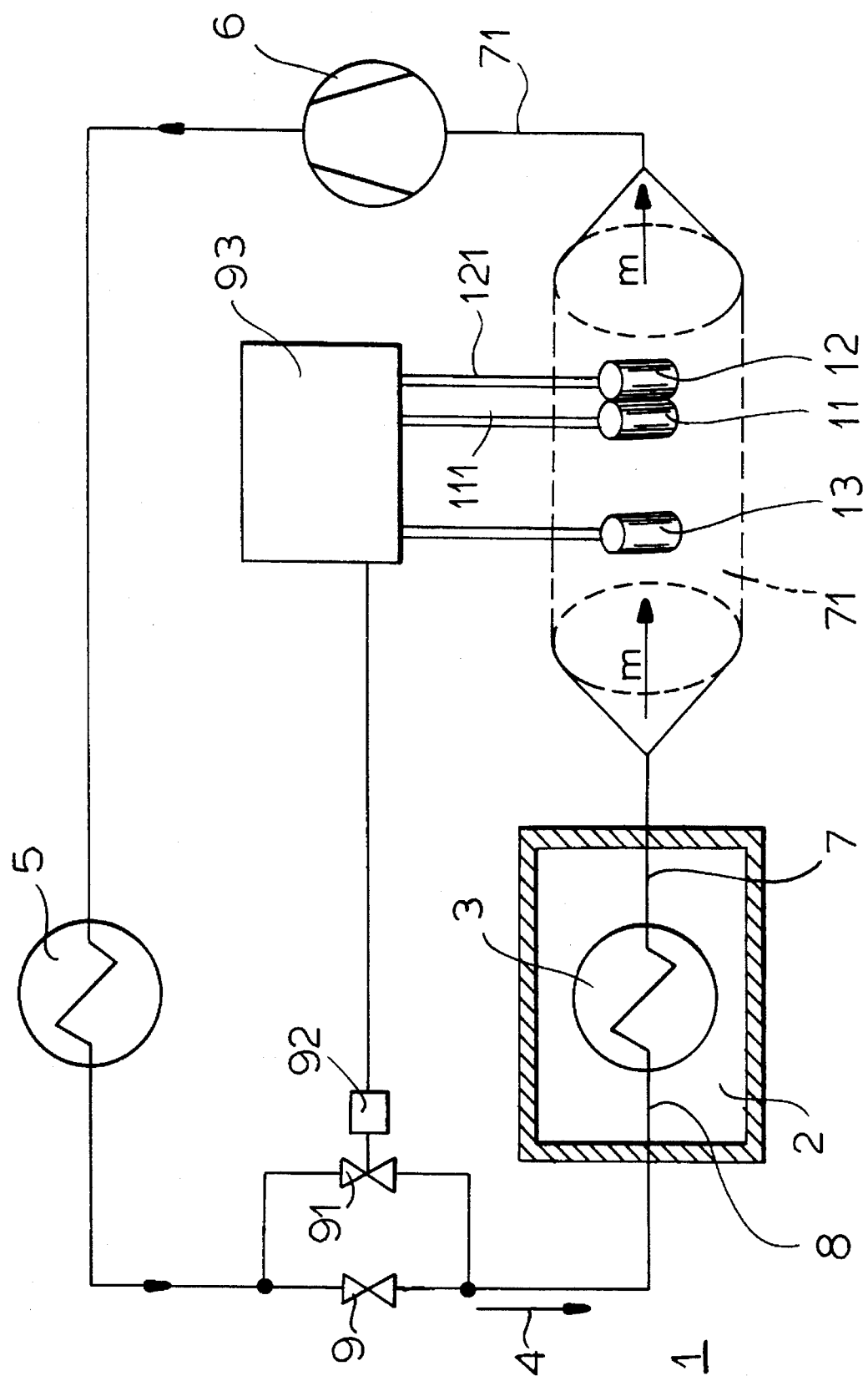
FIG. 1 is a diagram of a cooling installation wherein the process of the invention for setting, controlling and monitoring the level in a refrigerant evaporator is implemented.

In FIG. 1 a refrigerating installation 1 is shown with a space 2 to be cooled, e.g. a refrigerator, the passenger compartment of a vehicle or the like, wherein a refrigerant evaporator 3 for a refrigerant mass flow 4 is provided. The refrigerant mass flow 4 runs in a circuit between a low pressure effective in the refrigerant evaporator 3 and a high pressure effective in a condenser 5. At the outlet 7 of the refrigerant evaporator 3 a compressor 6 evacuates the refrigerant mass flow 4 evaporated into a gas. The gas should be basically liquid-free 6 the gas withdrawn at the outlet 7 of the 6 the vapor, respectively power gas aspired at the outlet 7 of the refrigerant evaporator 3 is compressed to high pressure and in the condenser 5 it is condensed into a substantially liquid refrigerant under high pressure, i.e. is liquefied.

In order to be able to introduce into the refrigerant evaporator 3 the refrigerant mass flow with its pressure lowered for evaporation, in the supply line to the inlet 8 of the refrigerant evaporator 3 a throttle valve 9 is provided. This throttle valve 9 can be a controllable valve, by means of which the pressure or the size of the refrigerant mass flow 4 can be set so that the refrigerant evaporator 3 is filled neither beyond nor below its capacity and the refrigerant mass flow 4 is optimal for the refrigerating installation 1. In the most simple case the throttle valve 9 can be a capillary tube. But an electrically, electronically or electromagnetically controllable valve can also be used; the value can also be thermostatic expansion value, a block valve or the like.

In order to insure that the refrigerant mass flow 4 of the refrigerating installation 1 is of the desired value, in a line 71 between the refrigerant evaporator and the compressor 6 a measuring device 11, 12, 13 is built in. The measuring device can detect the presence of liquid drops in the gas and makes possible to set up conditions wherein there will be no liquid drops of the refrigerant remaining in the power gas, and which could lower its quality and affect the operation of the refrigerating machine. This measuring device 11, 12, 13 designed as a so-called droplet sensor contains a heatable measuring unit 11, which is inserted in line 71 which is heat-insulated and vacuum-tight and pressure-tight with respect to the stationary parts of its surroundings, such as the walling of line 71. In FIG. 1 the line 71 is shown enlarged for better understanding.

The heatable measuring body 11 is for instance a heat resistance which can be heated to a predetermined temperature by a current supplied from the outside through line 111. The heatable measuring body 11 is connected with a temperature sensor 12 into a unit which can become a measuring resistance, by means of which the respective cooling of the heatable measuring body 11 can be indicated without delay to the outside through line 121. A further temperature sensor 13 is separate from the unit formed by the measuring body 11 and the temperature sensor 12, but is arranged in a common mounting inside the line 71 and is surrounded by the flow of gas. The measuring body 11 is contacted by the gas on as many surfaces as possible. The measuring body 11 does not have to lie in the path of the main flow of gas. It can also be arranged in a recess of the suction line, if the gas with any liquid particles or drops can enter this recess.

The measuring and control process of the above-described measuring device 11, 12, 13 takes place as follows:

The measuring body 11 is continuously heated with constant power, constant current or constant voltage to a predetermined temperature, for instance to 30K above the temperature of the dry gas. The temperature reached each time by the measuring 11 is directly measured and optionally indicated by the temperature sensor 12 forming a unit with the measuring body 11.

The further temperature sensor 13 measures continuously the temperature of the gas itself directly. This temperature is also optionally indicated. The impact of the liquid drops of the refrigerant on the heated measuring body 11 produces a cooling. Causes for this cooling effect is a strong increase of the heat transfer, i.e. the heat transfer coefficient increases and the evaporation heat to be supplied.

In order to utilize this cooling effect for the measuring techniques, the measuring body 11 is allowed to cool down and the temperature change is measured by means of the sensor 12 either as absolute value or with reference to the direct gas temperature measurement In another utilization of the cooling effect by the measuring techniques, the temperature of measuring body 11 or the temperature difference with respect to the gas is kept practically constant, by increasing the heating current at a constant voltage or by increasing the heating voltage at a constant current, or without specification of the voltage and current, the power is increased. Current, voltage or power are then utilized as measuring signals.

A sudden change of the measuring signal i.e. in the case of directly measured temperature of the measuring body 11 and at a constant power supply, a decrease, or in the case of a constantly maintained temperature an increase of the voltage, current or power is a strong indication that the refrigerant evaporator 3 is filled beyond capacity. Namely as soon as the refrigerant evaporator 3 is overcharged, at its outlet, liquid droplets of the refrigerant appear, fall on the measuring body 11, produce a cooling effect and cause a corresponding measured value in the measuring-control- and/or data display circuit.

With the aforedescribed process it is possible to optimally set, respectively to control the filling level of the refrigerant evaporator 3, to control the already available control devices for the filling level of the refrigerant evaporator 3, to determine an optimal level of the refrigerant evaporator 3 and to perform a continuous leakage monitoring of the refrigerating installation 1.

Regarding the control of the level of the refrigerant evaporator which can be a part of a flooded evaporation process or of a dry evaporation process, it has to be established that the aforedescribed method refers primarily to a dry evaporation process. The occurrence of the liquid droplets in the gas in a quantity which impairs the operation of a refrigerating installation has to be avoided, since the subsequent evaporation of the refrigerant in the compressor 6 leads to a lower efficiency of the refrigerating installation 1 and due to liquid-produced shocks device elements of the compressor 6, e.g. valves, can be damaged. A certain low content of liquid can be acceptable, since evaporation also, occurs between the measuring device and the compressor inlet and since the superheating has to be kept at a minimum in order to achieve an optimal output of the evaporator, which requires a certain small liquid content.

The aforementioned measuring device 11, 12, 13 can be operated according to two different methods. In the first method the temperature difference between the heated measuring body 11 and the further temperature sensor 13 operating as a reference sensor is kept constant, although the cooling effect of the measuring body 11 at the occurrence of liquid drops in the mass flow of refrigerant is subjected to considerable fluctuations. Therefore the voltage, the current intensity or the electric power for heating the measuring body 11 is correspondingly changed. There the voltage, the current intensity or the power serve as measuring signals.

According to the second method, the measuring body 11 is supplied with constant voltage, constant current intensity or constant power. There the temperature difference between the heated measuring body 11 and the temperature detected at the further temperature sensor 13 operating as a reference sensor 13 serves as a measuring signal.

The purpose of examining the gas is to establish whether the power gas is "moist", or "wet". The presence of this state of the gas has to be established with the assistance of an experimentally found criterion. A measure of the "moisture" or "wetness" of the gas is the local liquid content. This is defined as follows:

Local liquid content=$m'/m'+m''$, whereby the m' corresponds to the mass of the seething liquid and m'' to the mass of saturated vapor.

With the aid of the local vapor content x the local liquid content can also be expressed as follows:

Local liquid content=$1-x$.

When x has the value "1", it means that the gas consists of 100% gas, i.e. it is completely dry.

For the examination of the gas the measuring signal or signals of the measuring device 11, 12, 13 designed as droplet sensors are involved. The measuring signals are either the raw, unprocessed signals coming from the measuring device 11, 12, 13 designed as a droplet sensor, or further processed signals, e.g. the electric power supplied to the measuring body 11. Initially only the voltage signal of the measuring device 11, 12, 13, as well as the temperature of the measuring body 11 are known. In the further processing of the measuring signals the therein contained information for the evaluation of the presence of liquid droplets should not be lost.

The measuring signals can be evaluated by analog and/or digital circuitry. In both methods first an evaluation value is produced and then used. Examples of evaluation values are the frequency of the impact of liquid droplets on the measuring body 11, the amplitude of the measuring signal, the integral of the measuring signal or the standard deviation in the application of approximation methods.

For the production of evaluation values recognition circuits for amplitude analysis and/or frequency analysis or computer-assisted signal analysis can be used.

The evaluation values are subjected to so-called appraisal criteria, in order to determine the presence of liquid droplets or the local liquid content. For each evaluation value there is at least one appraisal criterion. Examples of appraisal criteria are:

The lowest number of observed liquid droplets per time unit when measuring the frequency of the impacting liquid droplets, the minimum value for the integral when measuring the integral between a predefined lower threshold and the occurring maximum of the evaluation value.

In the following an example for a particularly advantageous manner of evaluation is described in detail. The the voltage signals U occurring at the measuring device 11, 12, 13 designed as a droplet sensor are examined. In a preselected time interval Delta T, at equal time spans, the respective voltage signals U are picked up and prepared for the subsequent analysis. For this purpose all voltage signals U are divided into n-classes. In the lowest first class fall all measuring or voltage signals U which are greater than Umin and smaller than Umin+Delta U. In the last, respectively the highest class fall all voltage signals U which are bigger than Umax−Delta U and smaller than Umax. The number or magnitude classes results from the quotient of the difference between Umax and Umin by Delta U. The result of the aforedescribed evaluation method can be represented as a frequency distribution or as a histogram.

Figure 6:
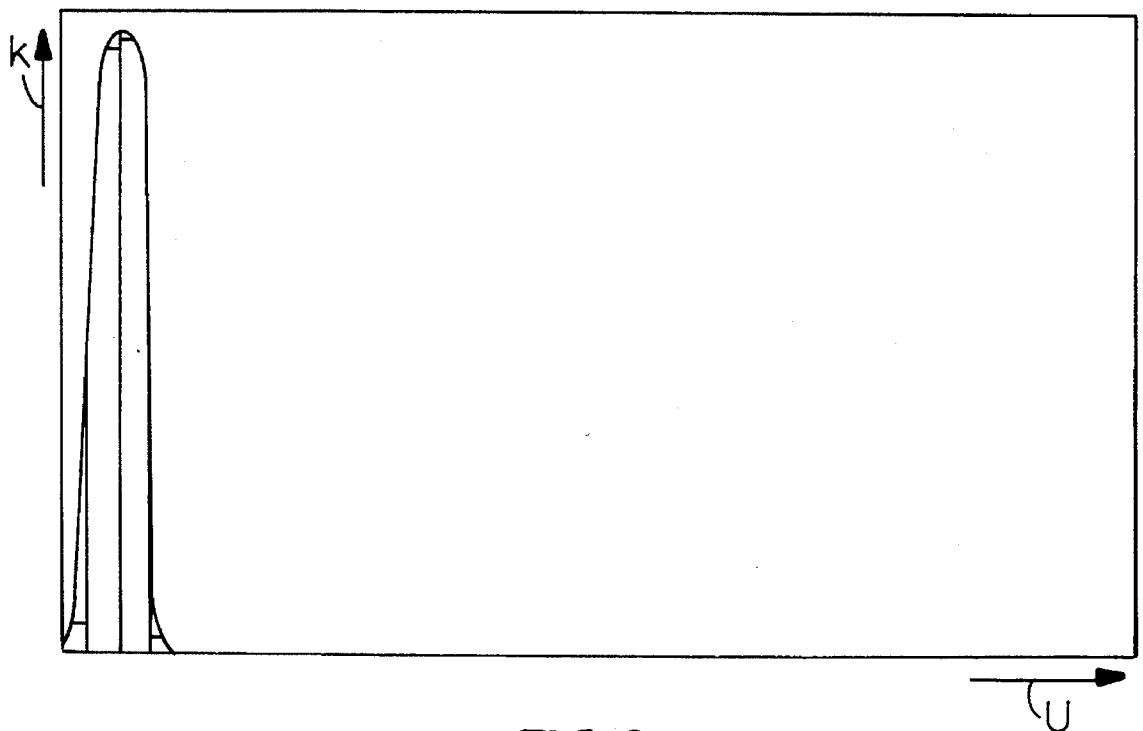
FIGS. 6 and 6A are diagrams of the electronic noise.
Figure 6A:
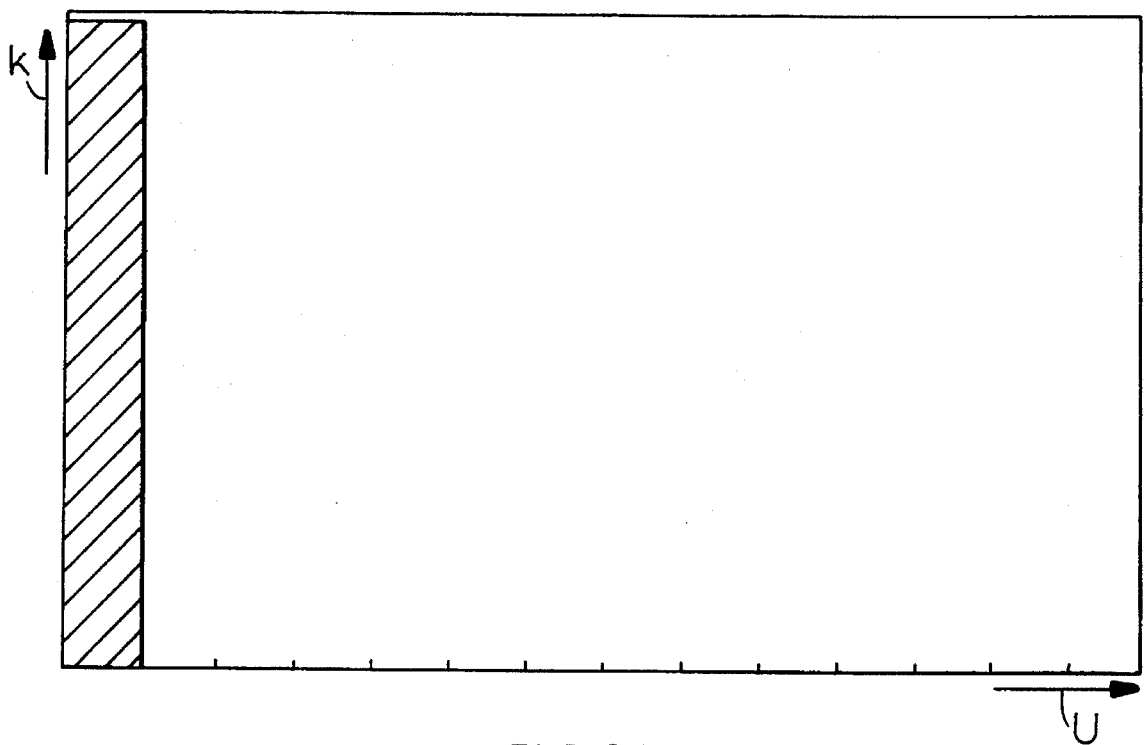

In FIGS. 6 and 6A the result of a measurement is represented wherein the measuring device 11, 12, 13 was situated in a still, gaseous medium. In this case only the basic value and the electronic noise are picked up, whereby in FIG. 6A the width of this noise is less or at a maximum equal to Delta U.

Figure 7:
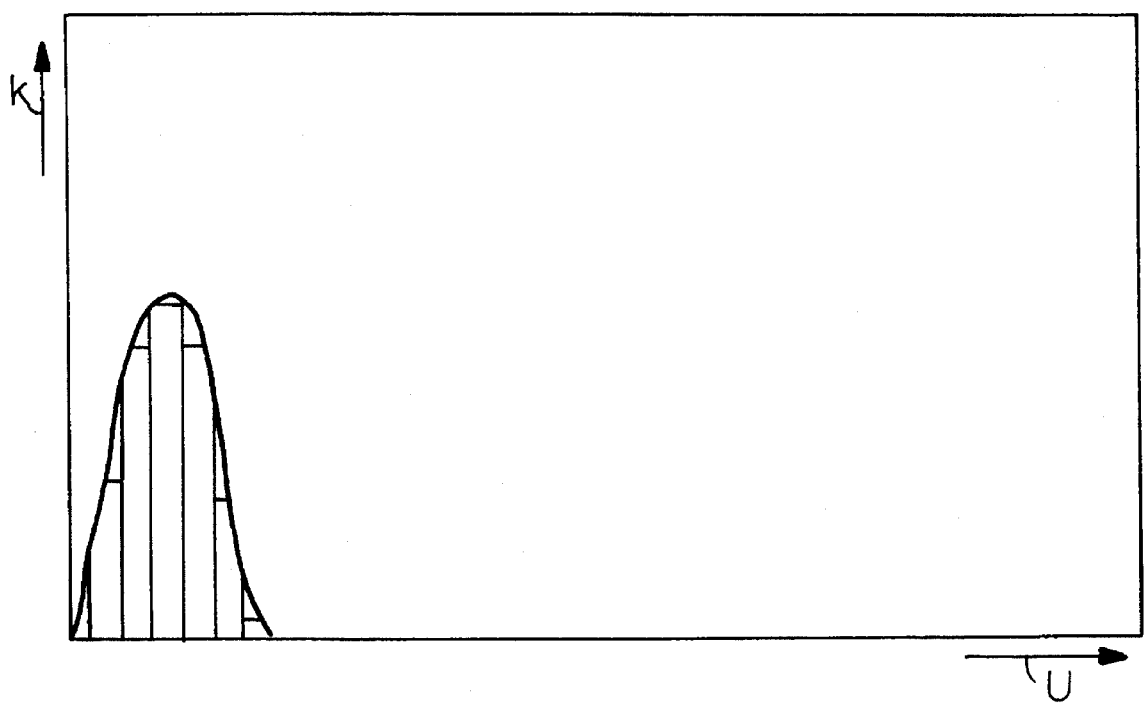
FIGS. 7 and 7A are diagrams of the basic signal.
Figure 7A:
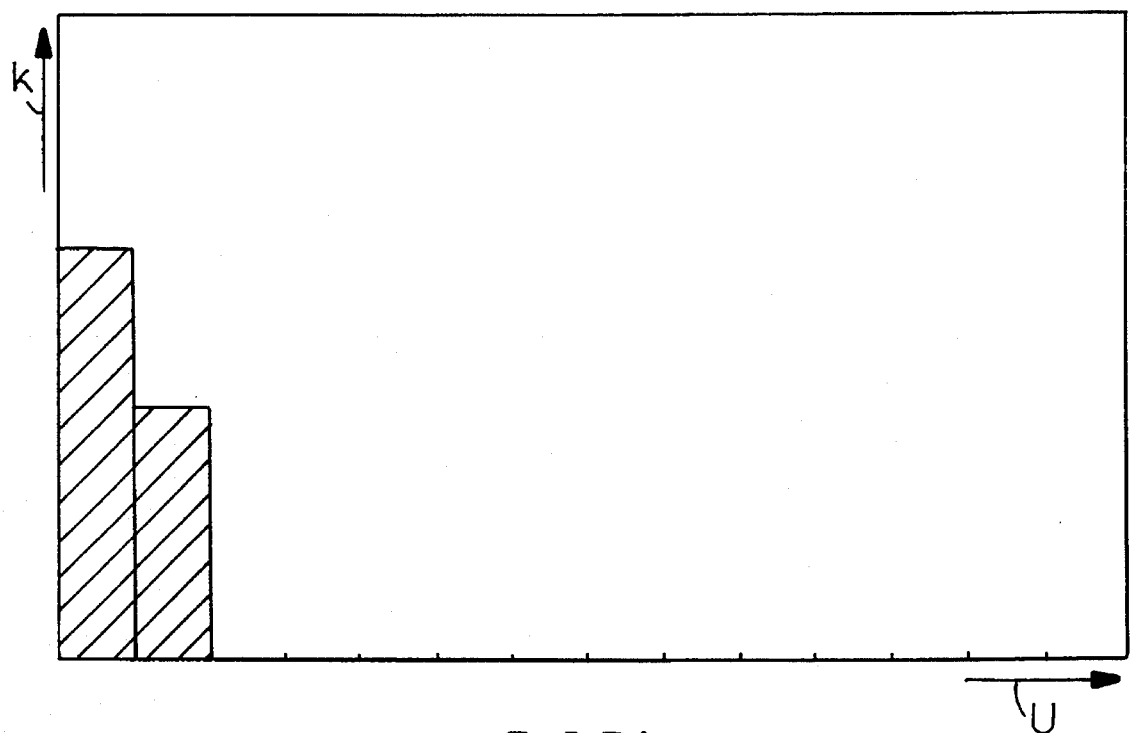

In FIGS. 7 and 7A the result of a measurement is represented, wherein the measuring device 11, 12, 13 designed as droplet sensor is situated in an absolutely dry, gaseous refrigerant stream. The modification of the frequency distribution, respectively of the histogram with respect to FIGS. 6 and 6A is caused by fluidics effects, e.g. by turbulence and fluctuations. The total width of the electronic noise plus the fluidics noise in FIG. 7A is smaller or reaches up to a maximum of 2 Delta U.

Figure 8:
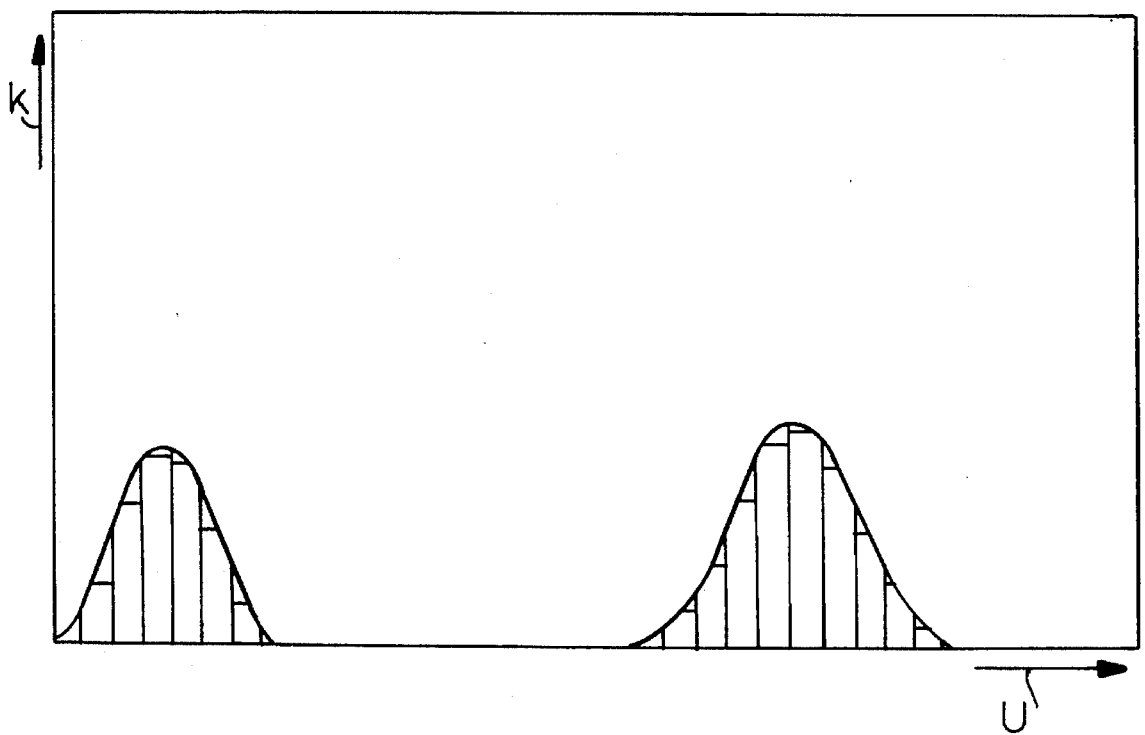
FIGS. 8 and 8A, 9, 9A are diagrams of the measuring signal when the suction line gas is wet.
Figure 8A:
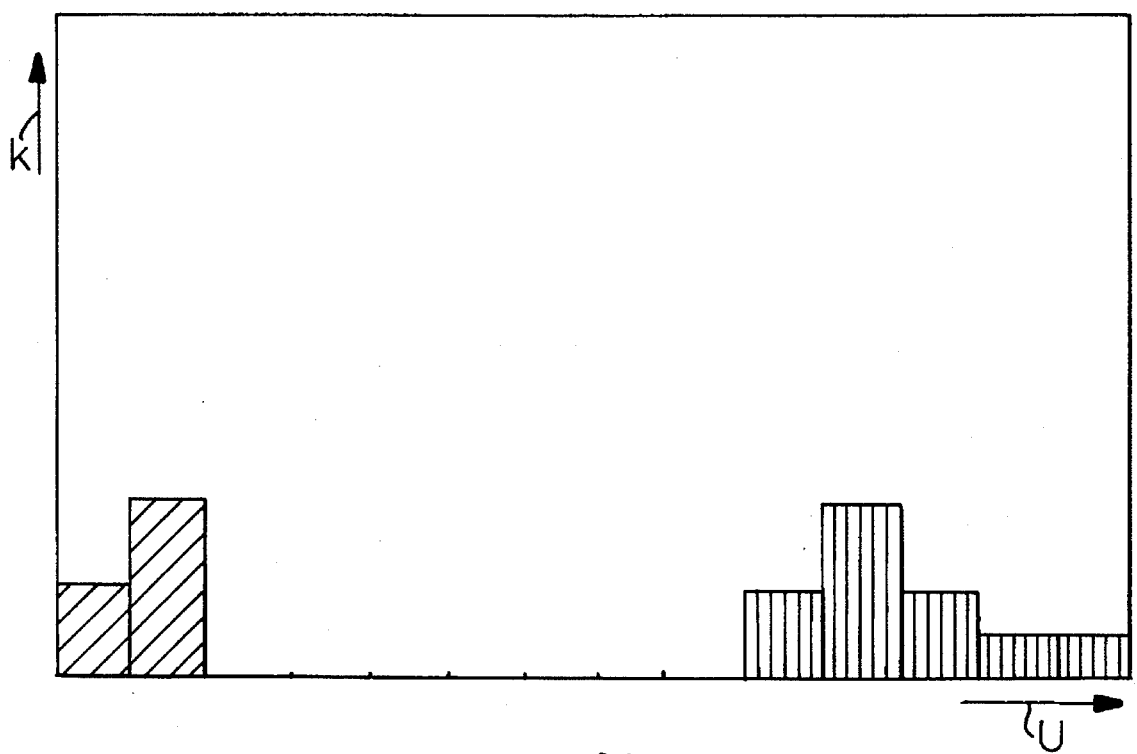

In FIGS. 8 and 8A the result of a measurement is represented, whereby the gas was wet. A part of the measuring signals are outside the range of the basic signal. In these measurements an increased heat output had to be provided for the measuring body 11, since as a result of the liquid droplets in the gas the measuring body 11 was additionally cooled.

Figure 9:
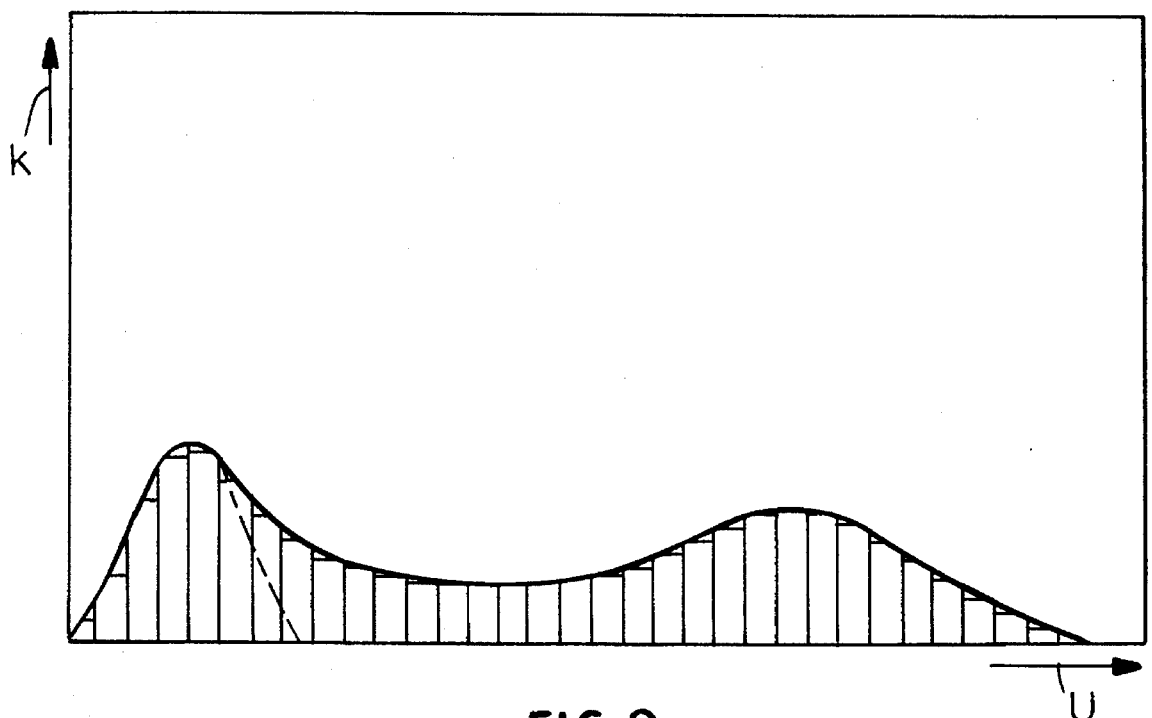
Figure 9A:
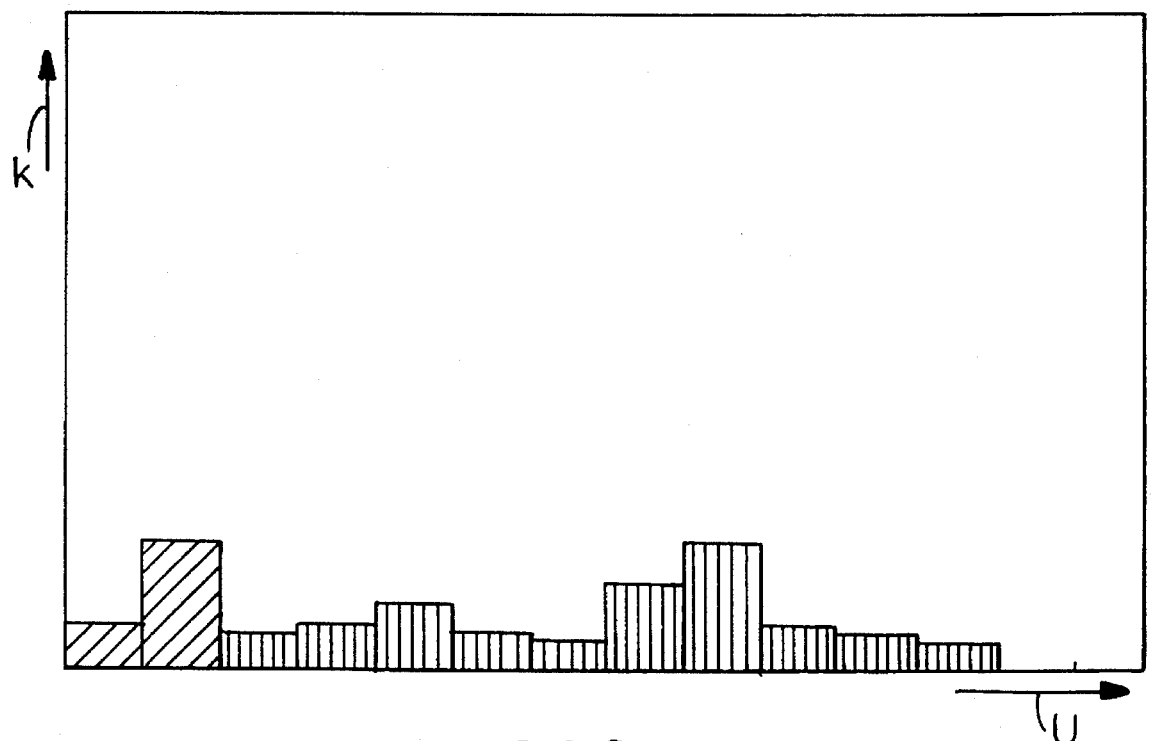

In FIGS. 9 and 9A the result of a further measurement is represented, whereby the gas was also wet. In contrast to FIGS. 8 and 8A, here the signal range caused by the liquid droplets is not separated from the signal range caused by electronic or fluidics noises. This effect observed as a rule is caused by the peak form produced by the liquid droplets and is created by the presence of many liquid droplets.

As soon as even one measuring signal lies outside the range of signals produced by the electronic and fluidics noise, the gas is no longer dry.

As soon as within the range of signals produced by the electronic and fluidics noise no further measuring signals occur and all of them are displaced beyond the mentioned range, the power gas is very wet. In this case the determination of the local liquid content is fraught with uncertainty. The basic signal can no longer be established without further steps. In order to still be able to make a reliable determination, the basic signal has to be determined with the assistance of a separate measurement of the gas velocity.

When in the flow of gas only measuring signals within the range of the electronic noise are found, the electronic system is no longer in a position to furnish the electric power necessary for maintaining a constant temperature of the measuring body 11. The cause for this is that the gas is wet to a large extent, or that the measuring point is located outside of the measuring range.

From the measurement results represented in FIGS. 8, 8A, and FIGS. 9, 9A, the local liquid content can be calculated. Thereby it can be seen from the histograms how much energy was spent for the evaporation of the refrigerant. Since besides that the evaporation enthalpy and the surface of the measuring body 11 swept by the flow are known, the local liquid content 1–x can be calculated, whereby in this calculation the following assumption is made:

All of the liquid droplets hitting the measuring body 11 are completely evaporated.

In this case 1–x can be the evaluating value for the local liquid content. The appraisal criterion is an experimentally established limit value for 1–x.

As an alternative the evaluation value in the method according to FIG. 8A and FIG. 9A can be the number of those measuring data which lie above the limit predetermined by the electronic and fluidics noises or another limit value to be determined.

The above-described evaluation technique can also be carried out with a multichannel analyzer, whereby then the channels of the multichannel analyzer correspond to the aforementioned magnitude classes.

In a particularly strongly modified embodiment of the aforementioned evaluation technique, from the m measuring signals picked up during a preselected time interval Delta T the smallest and the biggest value are established, whereby then the difference between these two is used as an evaluation value. As soon as this difference is greater than the signal width caused by the electronic and fluidics noise, the signal is to be considered as wet.

As an alternate to the above evaluating technique it is also possible to produce a binary sequence of pulses by means of a so-called recognition circuit. As soon as the frequency of these pulses, which corresponds to the evaluation value, is bigger than a predetermined, experimentally established limit value, which corresponds to the appraisal criterion, the gas is wet, or the set value for the local liquid content in the gas was surpassed.

It is also possible to establish with the aid of two recognition circuits the minimum and the maximum of the measuring signal and by means of a subsequent analog difference formation, to find the amplitude between two extreme values succeeding each other, whereby the amplitude then corresponds to the evaluation value. As soon as the amplitude is larger than a predetermined, experimentally found limit value which corresponds to the appraisal criterion, the gas is wet or the set limit value for the local liquid content is surpassed. The droplet velocity or the droplet frequency is also involved in the determination of the liquid content.

The values of the measuring signal can also be approximated through a mathematical function, e.g. a polynomial, whereby then the standard deviation can be calculated as evaluation value. As soon as this standard deviations is greater than an experimentally found limit value, which corresponds to the appraisal criterion, the gas is wet.

In the above description it was assumed that the pulsation of the gas caused by the compressor 6 of the refrigerating installation has no negative influence on the measuring signal. However when the basic frequency, i.e. the low-pass of the measuring device 11, 12, 13 comprising the measuring body 11 is so high that it has a disturbing influence on the basic signal, this disturbance can be filtered out by an analog or digital subsequent processing.

As far as a liquid film, a liquid ring or other liquid formations are present, which take care of the extreme cooling of the heated measuring body 11 by means of heat absorption through the mounting supports, to the mentioned effect has to be added the fact that the measuring signal with noise—compared with the duration of a signal for liquid drops—fluctuates over longer time periods. In this case the gas is very wet.

As soon as the measuring device 11, 12, 13 is extremely cooled, under the circumstances the electronic system cannot supply enough power to keep constant the above-described temperature difference between the measuring body 11 and the further temperature sensor 13. In this case too the gas in the suction line 71 is extremely wet.

Figure 2:
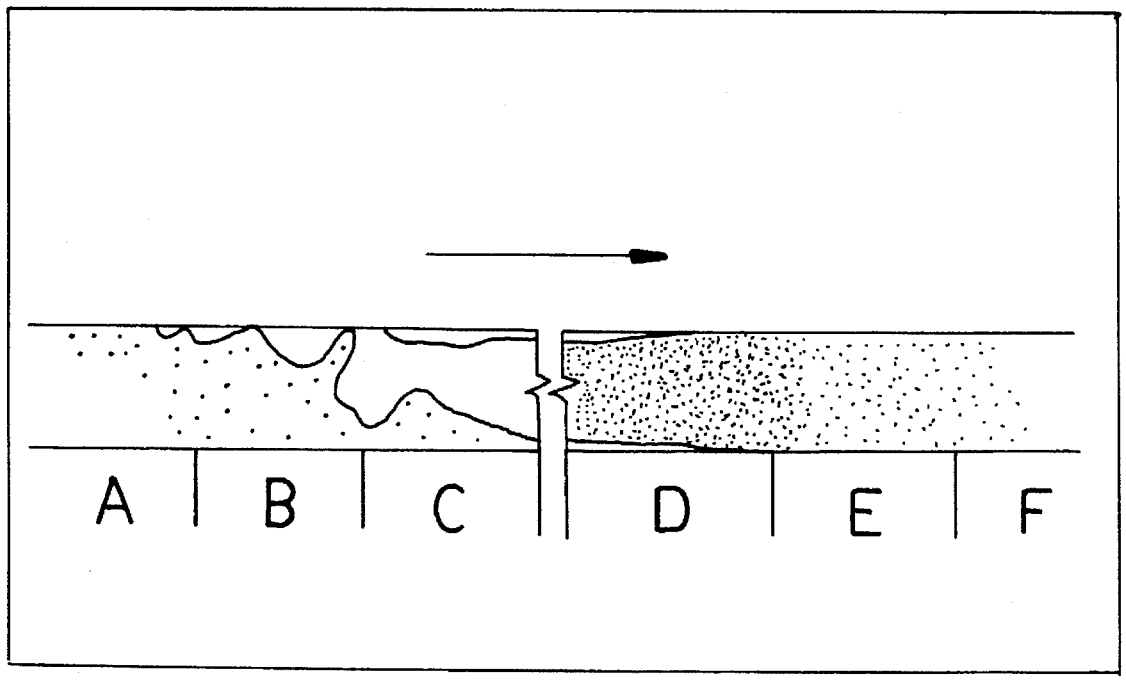
FIGS. 2 and 3 are diagrams in the evaporator in different mass flow velocities.

A flow form represented in FIG. 2 is created in the refrigerant evaporator 3 at a high mass velocity, whereby at the inlet (8) of the refrigerant evaporator 3 subcooled liquid is present, while at the outlet 7 of the refrigerant evaporator 3 superheated vapor is present. In the area A there is a bubbly flow, in the area B a bulb-blowing flow, in the area C a liquid ring, in the area D a mist with liquid film, in the area E a mist and in the area F a single-phase liquid.

Figure 3:
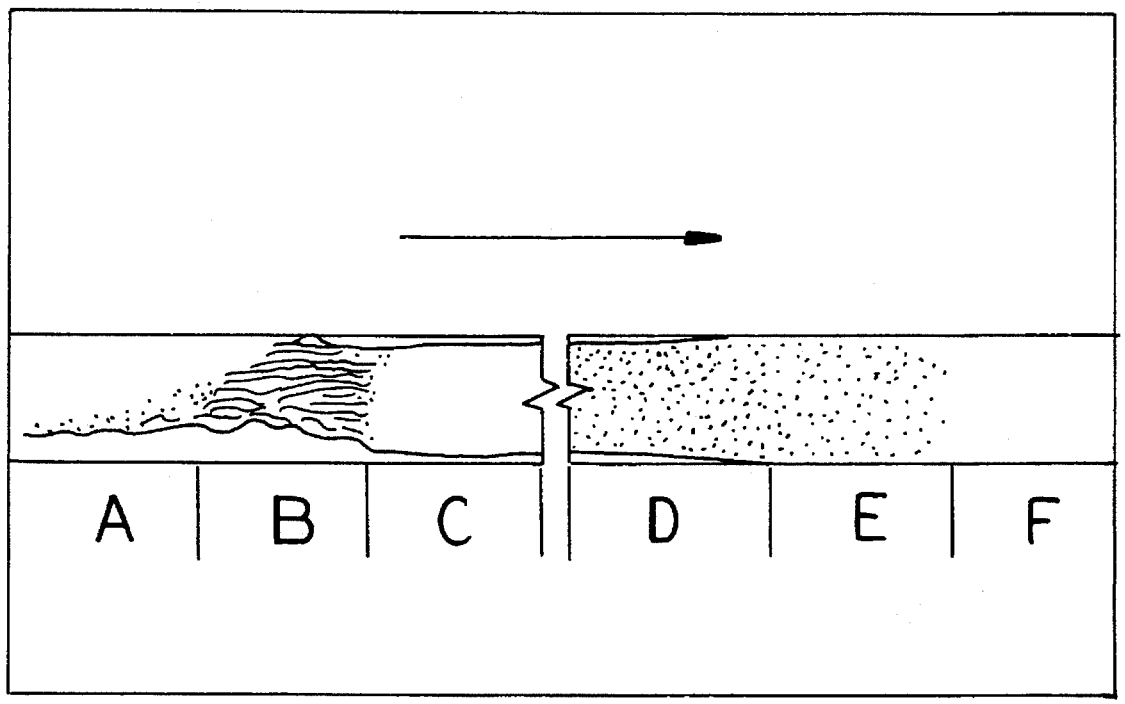

A flow form represented in FIG. 3 is created in the refrigerant evaporator 3 in conditions of low mass velocity. Thereby at the inlet 8 of the refrigerant evaporator 3 already 20% of the refrigerant is evaporated. At the outlet 7 of the refrigerant evaporator 3 there is superheated vapor. In the area A there is a wave, in the area B a transition, in the area C a liquid ring, in the area D a mist with liquid film, in the area E a mist and in the area F a single-phase liquid.

Figure 4:
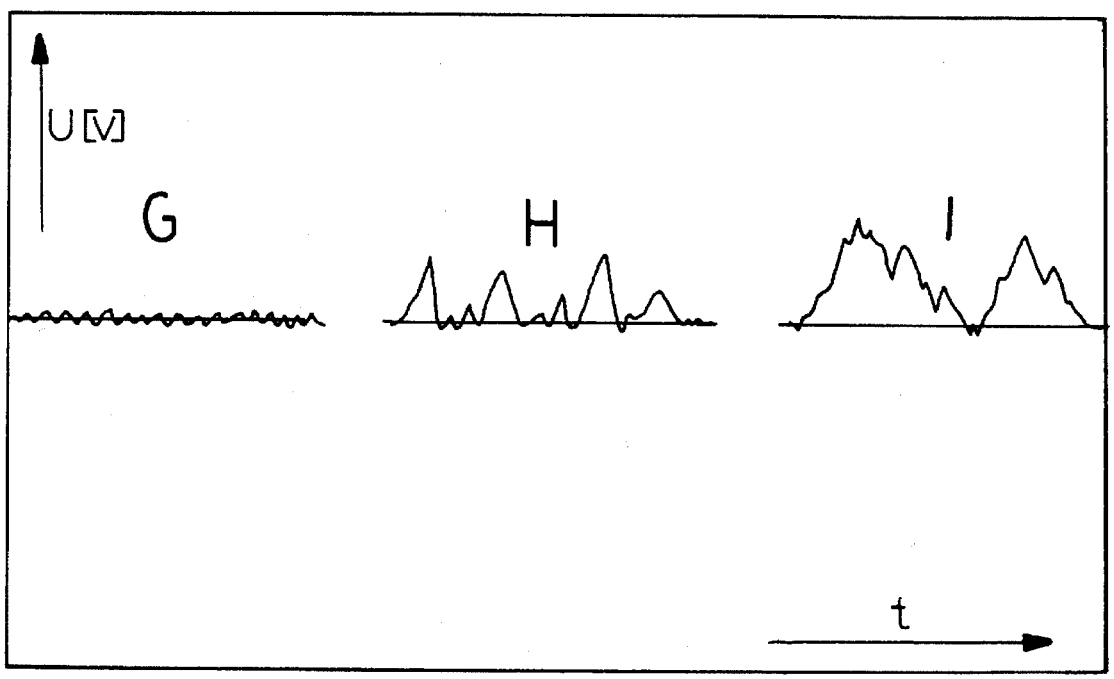
FIG. 4 is a graph showing the measuring signal of a measuring unit at constant temperature difference.

The measuring signal of the measuring device 11, 12, 13 designed as a droplet sensor results at a constant temperature difference between the measuring body 11 and the further temperature sensor 13 is as graph G, when the gas is dry, or superheated, as graph H when there is a low local liquid content and as graph I when there is a high local liquid content, as shown in FIG. 4.

Figure 5:
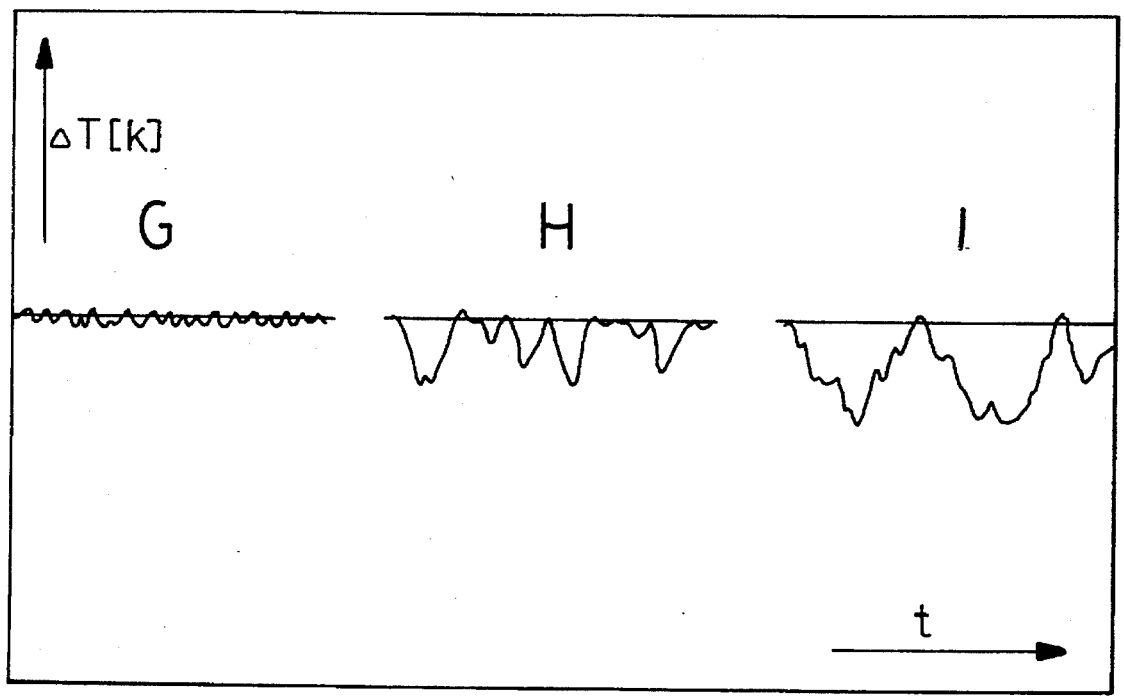
FIG. 5 is a graph of the measuring signal of the measuring unit at constant voltage supply.

At a constant voltage supply of the measuring body 11 of the measuring device 11, 12, 13 results the measuring signal corresponding to graph G when the gas is dry, or superheated, as graph H when there is a low local liquid content and as graph I, when there is a high local liquid content, as shown in FIG. 5.

A further simple classification of the measured values results as follows:

During the measuring process in the detection interval Ta exactly one measurement takes place. The respective N-measured values to be examined require therefore a total measuring time NTa.

In the conversion of an analog measuring signal into a digital word, the classification of the measured values can be performed advantageously as follows:

In the measuring process in equal time intervals which are also called detection periods Ta, within a time interval Delta T the measured values m are picked up, i.e. Delta T=m×Ta.

The measuring signal of the measuring device or droplet sensor is then for instance fed to an analog/digital converter. The latter supplies after each reading a digital word, which is proportional to the amplitude of the fed measuring signal.

The digital word is at the same time the number of the class, since this measured value has to be classified for the determination of the amplitude distribution. For instance in a 10-bit analog/digital converter 1024 classes result, whose class width in a measuring range between 0 and 30 volt is Delta U=29.3 mV.

The occurrence of a digital word is interpreted as an event. The number of these events is summed up separately for each class. The sum represents the absolute frequency in class n.

In conclusion it has to be pointed out that besides the liquid content of the gas, it can be advantageous for the control of the evaporator level to use also the superheating Delta Tü or the difference between the temperature of the refrigerant at the evaporator outlet and the temperature of the refrigerant at the evaporator inlet. The last-mentioned value is particularly useful when the evaporator is filled only a little, because at this point in the process under circumstances the liquid content is very low and therefore contains only little information.

I claim:

1. A process for setting, controlling and monitoring a filling level of a refrigerant evaporator in a closed circuit of a refrigerating machine and evaporating a mass flow of refrigerant into a substantially dry gas in a suction line of said circuit downstream of said refrigerant evaporator, said process comprising the steps of:

(a) inserting into said suction line a heatable measuring body so that said body contacts said gas and is impacted by refrigerant drops;

(b) heating said body to a temperature differential above the temperature of the suction line gas and applying a measuring and evaluation circuit to record a measuring signal representing the energy supplied and establishing a basic signal comprised of a signal component representing electronic noise of said measuring and evaluating circuit and another signal representing passage of dry gas past said body;

(c) measuring, with said measuring and evaluation circuit during said mass flow, energy needed to evaporate refrigerant drops hitting said body, thereby producing a measuring signal;

(d) forming a difference between said measuring signal and said basic signal (e) comparing said difference with an adjustable reference value establishing a threshold above which the gas traversing said suction line is considered to contain excess liquid; and (f) setting, controlling and monitoring said filling level in response to determination as to the liquid content of said gas in said suction line.

2. The process defined in claim 1 wherein a temperature of the measuring body detected by means of a temperature sensor is used as measured value.

3. The process defined in claim 1 wherein energy expanded for maintaining a constant temperature of the body above the suction line gas temperature is used as a measured value for said measuring signal.

4. The process defined in claim 1 wherein a voltage of an energy source operated with constant current intensity provided for heating the body is used as a measured value for said measuring signal.

5. The process defined in claim 1 wherein a current intensity of an energy source operated at constant voltage provided for heating the body is used as a measured value for said measuring signal.

6. The process defined in claim 1 wherein an electric power of an energy source provided for heating the body is used as a measured value for said measuring signal.

7. The process defined in claim 1 wherein in a preselectable time interval Delta T at respectively equal time periods a measuring signal (m) indicating a measured value for said measuring signal is picked up, and the measuring signals (m) picked up during the time interval Delta T are divided into magnitude classes, whereby to the first magnitude class are assigned all measuring signals (m) ranging between Mmin and Mmin +Delta M, and to the last magnitude class are assigned all measuring signals (m) ranging between Mmax–

Delta M and Mmax, and the number of magnitude classes results from the quotient of the difference (Mmax–Mmin) : Delta M.

8. The process defined in claim 7 wherein the Delta M is calculated so that the first magnitude class corresponds at least to the first partial signal composed of the electronic noise of the measuring and evaluation unit and the first plus second magnitude class corresponds at least to the basic signal.

9. The process defined in claim 8 wherein a measuring device comprising the measuring body is calibrated as a mass flow meter for dry suction line gas.

10. The process defined in claim 8 wherein for the grouping of the measuring signals (m) in magnitude classes a multichannel analyzer is used.

11. The process defined in claim 1 wherein in a preselectable time interval Delta T, at equal time periods a measuring signal (m) indicating the measured value for said measuring signal is picked up, from the resulting values a minimal and a maximal value is established, the difference between the maximal and minimal value is calculated and compared as an evaluation value with the noise width resulting from the electronic noise and the flow of dry suction line gas passing the measuring body.

12. The process defined in claim 1 wherein by means of a recognition circuit a binary pulse sequence is produced and the number of pulses occurring during a predetermined time period is compared with the limit value corresponding to the maximum admissible wetness content of the suction line gas.

13. The process defined in claim 1 wherein by means of a respective recognition circuit the minimum, respectively the maximum of the measured value is found, by means of analog difference formation the amplitude between two extreme values succeeding each other is established as an evaluation value and compared with a determined limit value corresponding to the maximum admissible wetness content of the suction line gas.

14. The process defined in claim 1 wherein the measuring signals are approximated through a mathematical function, the standard deviation of the function is calculated as an evaluation value and compared with a determined limit value corresponding to the maximum admissible wetness content of the suction line gas.

15. The process defined in claim 8 wherein the periodic fluctuations caused by a compressor of the refrigerating system and superimposed on the measuring signal are eliminated by an analog or digital filtering.

16. The process defined in claim 8 wherein the measurement data are subjected to a spectral analysis, whereby from the measurement data the autocorrelation function or another function which can be derived from the autocorrelation function is determined, and whereby the function obtained from the basic signal serves as a comparative function.

17. The process defined in claim 8 wherein the velocity of flow of the suction line gas is separately established and this velocity of flow of the suction line gas is involved in the determination of the basic signal.

* * * * *